Jan. 23, 1923.
S. B. HASELTINE.
FRICTION SHOCK ABSORBING MECHANISM.
FILED MAY 26, 1920.
1,442,877
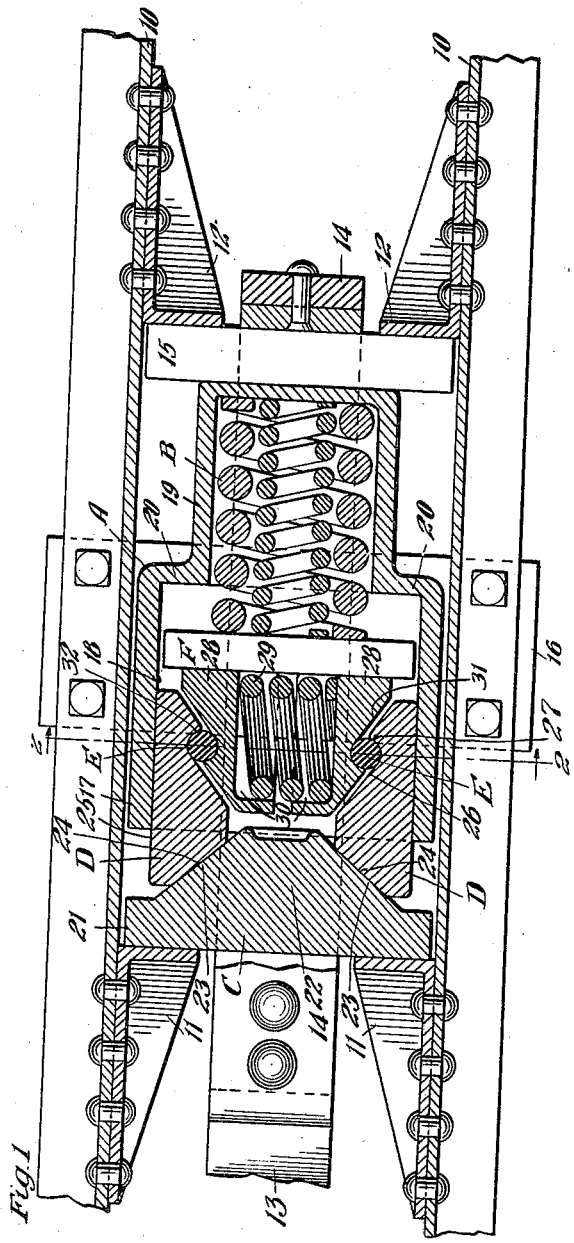
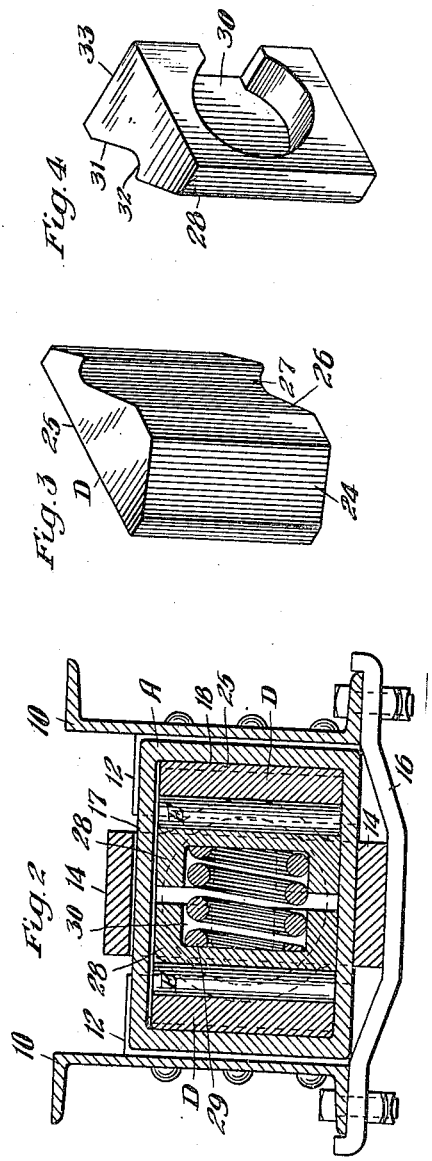
Witnesses
Wm. Geiger
Una C. Grigsby
Inventor
Stacy B. Haseltine
By Geo. I. Haight
His Atty.

Patented Jan. 23, 1923.

1,442,877

UNITED STATES PATENT OFFICE.

STACY B. HASELTINE, OF CHICAGO, ILLINOIS, ASSIGNOR TO WILLIAM H. MINER, OF CHAZY, NEW YORK.

FRICTION SHOCK-ABSORBING MECHANISM.

Application filed May 26, 1920. Serial No. 384,321.

*To all whom it may concern:*

Be it known that I, STACY B. HASELTINE, a citizen of United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism especially adapted for railway draft riggings and wherein is obtained an easy graduated cushioning resistance and certain release.

More specifically, the object of the invention is to provide a friction shock absorbing mechanism wherein are employed a friction shell, friction shoes, spreaders at each end of the shoes to maintain a balanced spreading or expanding action on the shoes, the expanding action on the shoes being so applied as to obtain a graduated substantially uniformly increasing frictional resistance.

In the drawing forming a part of this specification, Figure 1 is a horizontal longitudinal sectional view of a portion of a railway draft rigging showing my improvements in connection therewith. Figure 2 is a vertical transverse sectional view taken substantially on the line 2—2 of Figure 1. And Figures 3 and 4 are detailed perspectives of one of the friction shoes and one of the sections of a compressible wedge, respectively, employed with my improvements.

In said drawing, 10—10 denote channel shaped center or draft sills of a railway car to the inner faces of which are secured front stop lugs 11 and rear stop lugs 12. A portion of a drawbar is indicated at 13, the same having secured thereto a yoke 14 of well known form. The shock absorbing mechanism proper, hereinafter described, and a rear follower 15 are disposed within the yoke and the same are adapted to be supported by a detachable saddle plate 16.

The improved shock absorbing mechanism, as shown, comprises, broadly, a combined friction shell and spring cage casting designated generally by the reference A; a main spring resistance B; an outer spreader or wedge C; a pair of friction shoes D—D; a sectional compressible wedge, hereinafter described in detail; anti-friction rollers E—E between the compressible wedge and the shoes; and a spring follower F interposed between the main spring and the compressible wedge.

The casting A is formed with the friction shell at the forward or outer end thereof, said shell being indicated at 17, the same being of substantially rectangular formation providing opposed longitudinally extending friction surfaces 18—18 on the opposite sides thereof. Rearwardly of the shell 17, proper, the casting A is of cylindrical formation as indicated at 19 to form a centering cage for the main coil spring B. The rear end of the cage is obviously adapted to bear against the follower 15. It will be observed also that shoulders 20—20 are formed where the section of the casting A changes from the rectangular to the cylindrical, said shoulders 20 being arranged to limit the inward movement of the follower F and hence to prevent overcompression of the main spring B.

The outer spreader or wedge C preferably combines a front follower 21 and a two-faced wedge section 22, the wedge faces being indicated at 23—23. Said wedge faces 23 are adapted to cooperate with corresponding wedge faces 24—24 on the outer ends of the two friction shoes D—D.

The friction shoes are provided with flat friction surfaces 25—25 cooperable with the friction surfaces 18 of the shell. Near their inner ends, the shoes D are formed with wedge faces 26—26 oppositely inclined with respect to the wedge faces 24. Said shoes D are also provided with shoulders or seats 27 for the anti-friction rollers E in order to limit their inward movement with respect to the shoes as will be understood by those skilled in the art.

The compressible inner wedge or spreader, as shown, comprises two sections 28—28 of like construction and oppositely arranged and an interposed transversely arranged spring 29. Each of said sections 28 is recessed on its inner face as indicated at 30 to form a seat for one end of the spring 29 and on its outer face is provided with a wedge face 31 parallel and opposed to the corresponding wedge face 26 of a shoe D. Each wedge section 28 is also provided with a shoulder or roll seat 32 opposite the corresponding roll seat 27. The inner faces of the wedge sections 28 are made flat as indicated at 33 where the same bear on the follower F. As clearly shown in Figures 1 and 2, the wedge sections 28 are normally separated and so maintained by placing the spring 29 under initial compression.

The operation is as follows: Upon inward or buffing movement of the drawbar, the front wedge or spreader C will be forced rearwardly, thereby pushing the shoes D in the same direction. Movement of the shoes D relatively to the shell 17 is resisted by means of the spring B acting through the follower F, compressible inner wedge and rollers E. As the rearward movement of the shoes D continues, the resistance to the compressible wedge increases uniformly in accordance with the compression of the spring B and this increasing resistance will be reflected in a gradual slight compression of the compressible wedge and rolling of the rollers E upon their corresponding sets of wedge faces 26 and 31. The resistance due to the friction set up between the flat faces of the wedge sections 28 and the follower F backed by the spring B, combined with the resistance offered by the spring 29 is sufficiently great to prevent full compression of the wedge during the compression of the spring B. The follower F will ultimately engage the shoulders 20 which will terminate the inward movement of the wedge sections 28 but a slight additional inward movement of the shoes D will be permitted as the compressible wedge is further compressed against the action of the spring 29. It is evident that the action last described will effectively increase the frictional resistance between the shoes D and shell 17 so that the final action in the compressive stroke is made relatively easy or graduated as is also the action immediately preceding the final contraction of the inner wedge. Upon removal of the actuating force, the wedge sections 28 will be automatically expanded under the influence of the spring 29 thereby squeezing the rollers E outwardly and causing a simultaneous similar movement of the shoes D during which action the radial or outward pressure on the shoes D is very quickly reduced and certainty of release insured. By employing the inner and outer wedges, as described, it is evident that I obtain a balanced spreading action on the shoes, that is, the shoes are pressed outwardly at both their outer and inner ends by reason of which the wear on the shoes and shell is minimized and evenly distributed without danger of gouging any of the parts as might otherwise result where the shoes are pressed outwardly at one end only.

I claim:

1. In a friction shock absorbing mechanism, the combination with a friction shell; of friction shoes cooperable with said shell and movable longitudinally thereof, each shoe having oppositely arranged wedge faces at its ends; a main spring resistance; an outer wedge cooperable with the wedge faces at the outer ends of the shoes; an inner wedge cooperable with the wedge faces at the inner ends of the shoes and interposed between the latter and said main spring, said inner wedge being compressible, and movable longitudinally of the shell; and means for limiting the longitudinal movement of said compressible wedge inwardly of the shell before the end of the full compression stroke of the mechanism.

2. In a friction shock absorbing mechanism, the combination with a friction shell; of friction shoes cooperable with said shell and movable longitudinally thereof, each shoe having oppositely arranged wedge faces at its ends; a main spring resistance; an outer wedge cooperable with the wedge faces at the outer ends of the shoes; an inner wedge cooperable with the wedge faces at the inner ends of the shoes and interposed between the latter and said main spring, said inner wedge being compressible, and comprising two normally separated independent sections and a spring therebetween, and movable longitudinally of the shell; and means for limiting the longitudinal movement of said compressible wedge inwardly of the shell before the end of the full compression stroke of the mechanism.

3. In a friction shock absorbing mechanism, the combination with a friction shell; of friction shoes cooperable with said shell and movable longitudinally thereof, each of said shoes having inner and outer oppositely extending wedge faces; an outer wedge cooperable with the wedge faces at the outer ends of the shoes; a main spring resistance; an inner compressible wedge interposed between said shoes and main spring resistance, said inner wedge being movable longitudinally of the shell and having wedge faces opposed to the wedge faces at the inner ends of the shoes; anti-friction rollers interposed between said last named sets of wedge faces, and means for limiting the longitudinal movement of said compressible wedge inwardly of the shell before the end of the full compression stroke of the mechanism.

4. In a friction shock absorbing mechanism, the combination with a friction shell; of friction shoes cooperable with said shell, each of said shoes having oppositely extending wedge faces at its ends; an outer main wedge cooperable with the wedge faces at the outer ends of the shoes; a main spring resistance; a follower against which bears the end of said spring resistance nearest the shoes; and a compressible wedge interposed between said follower and the wedge faces at the inner ends of the shoes, said compressible wedge comprising independent normally separated sections and a spring therebetween, said shell having shoulders to limit the inward movement of said follower with respect to the shell.

In witness that I claim the foregoing I have hereunto subscribed my name this 8th day of May, 1920.

STACY B. HASELTINE.

Witness:
   CARRIE GAILING.